Figure 1:
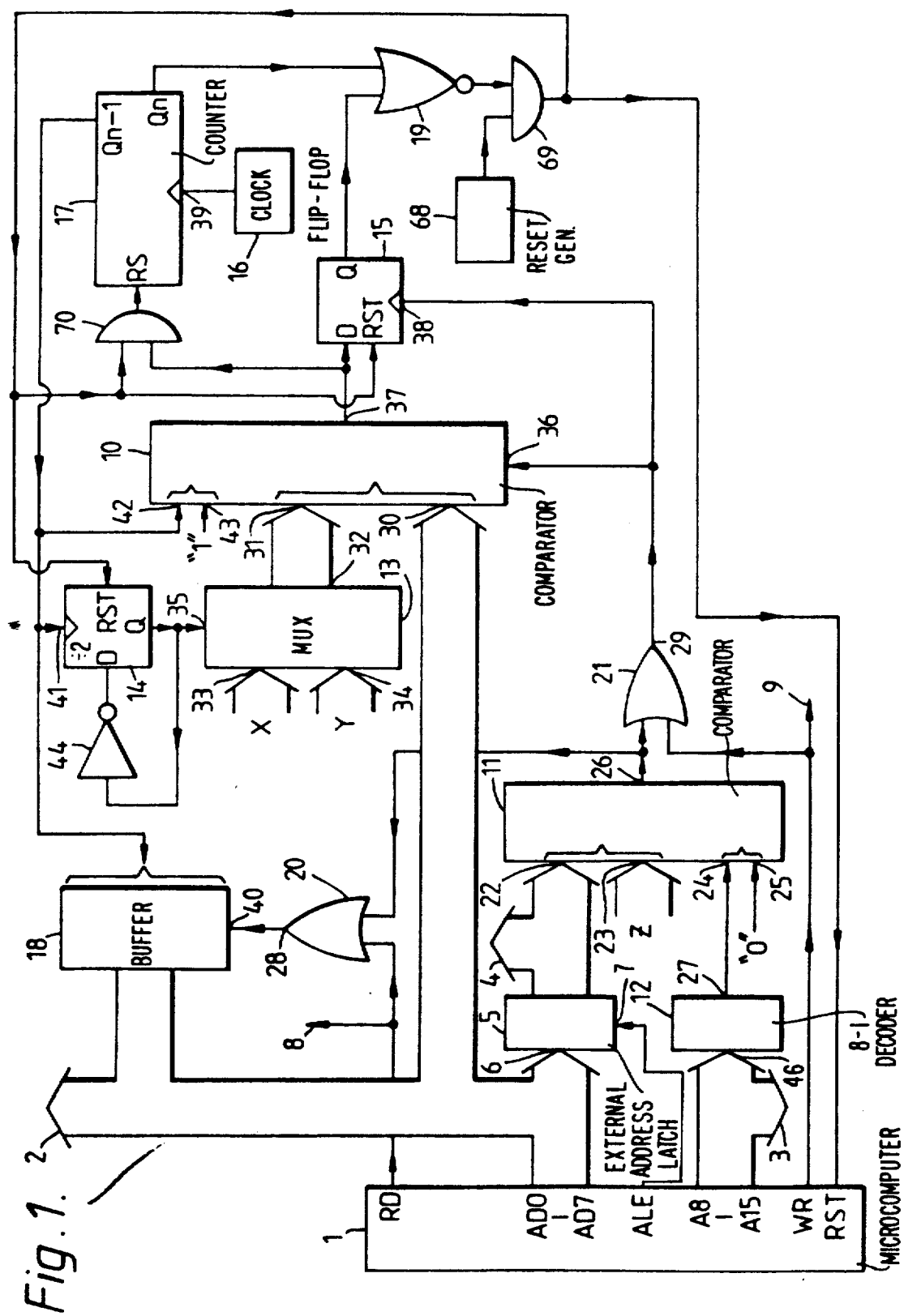

United States Patent [19]

Johnson

[11] Patent Number: 5,073,853
[45] Date of Patent: Dec. 17, 1991

[54] WATCHDOG CIRCUIT FOR MONITORING PROGRAMS AND DETECTING INFINITE LOOPS USING A CHANGING MULTIBIT WORD FOR TIMER RESET

[75] Inventor: Nigel L. Johnson, Wisbech, United Kingdom

[73] Assignee: U.S. Philips Corporation, New York, N.Y.

[21] Appl. No.: 116,415

[22] Filed: Nov. 2, 1987

[30] Foreign Application Priority Data

Nov. 3, 1986 [GB] United Kingdom ............... 8626197

[51] Int. Cl.⁵ .................................... G06F 11/30
[52] U.S. Cl. .................................... 395/575; 364/264; 364/267; 364/267.9; 364/DIG. 1; 371/16.3
[58] Field of Search ... 364/200 MS File, 900 MS File; 371/62, 63.1

[56] References Cited

U.S. PATENT DOCUMENTS

| | | | |
|---|---|---|---|
| 3,919,533 | 11/1975 | Einolf et al. | 371/62 |
| 4,405,982 | 9/1983 | Ruhnau | 371/16.3 |
| 4,538,273 | 8/1985 | Lasser | 371/16.3 |
| 4,570,217 | 2/1986 | Allen | 364/188 |
| 4,594,685 | 6/1986 | Owens | 364/900 |
| 4,649,537 | 3/1987 | Rosswurm | 371/16.3 |
| 4,683,568 | 7/1987 | Urban | 371/16.1 |
| 4,689,766 | 8/1987 | Kent | 364/900 |
| 4,727,549 | 2/1989 | Tulpule | 371/62 |
| 4,759,952 | 7/1988 | Dahnert | 371/16.3 |
| 4,763,296 | 8/1988 | Gercekci | 371/62 |
| 4,775,957 | 10/1988 | Yakuwa et al. | 371/62 |
| 4,796,211 | 1/1989 | Yokouchi | 371/62 |
| 4,803,682 | 2/1989 | Hara | 371/62 |
| 4,809,280 | 2/1989 | Shonaka | 371/62 |
| 4,813,042 | 3/1989 | Maaloe | 371/16.1 |
| 4,879,647 | 11/1989 | Yazawa | 371/16.3 |
| 4,896,321 | 1/1990 | Kawahara | 371/16.3 |
| 4,912,708 | 3/1990 | Wendt | 371/16.3 |
| 5,012,435 | 4/1991 | Bailey | 371/16.3 |

FOREIGN PATENT DOCUMENTS 1522810 8/1978 United Kingdom.

*Primary Examiner*—Thomas C. Lee
*Assistant Examiner*—Eric Coleman
*Attorney, Agent, or Firm*—Anne E. Barschall

[57] ABSTRACT

A data processing system includes a microcomputer (1) provided with an address latch (5). The microcomputer is provided with a watch-dog arrangement which comprises the usual clocked counter (17) an output ($Q_n$) of which is coupled to a reset input (RST) of the microcomputer. In order to increase the number of malfunctions to which the watch-dog responds the microcomputer is arranged to repeatedly generate reset signals each in the form of a complete byte X or Y which alternate. These are applied to an input (30) of a comparator (10) which compares them with identical bytes fed to a further input 31 via a switched multiplexer (13), the comparator output (37) being connected to a reset input (RS) of the counter. Each time this occurs the microcomputer strobes the watch-dog by applying its address to a further input (46, 22). If the byte applied to the comparator input (30) is incorrect and/or if this application does not occur within a time window defined by a period during which a further output ($Q_n - 1$) of the counter is logic "1" the resulting level at the comparator output (37), stored in a flip-flop (15), resets the microcomputer. The state of the signal at the further output ($Q_n - 1$) of the counter is periodically ascertained via a buffer (18). Each of the bytes X and Y is obtained by complementing the previous such byte, stored in RAM, further program steps being carried out between each such complementing operation and the preceding and succeeding generation of a reset signal.

13 Claims, 2 Drawing Sheets

WATCHDOG CIRCUIT FOR MONITORING PROGRAMS AND DETECTING INFINITE LOOPS USING A CHANGING MULTIBIT WORD FOR TIMER RESET

This inven re to a programmed digital data processing system including a watch-dog circuit arrangement, which arrangement comprises timer means to which is coupled a reset signal input, for generating an output signal in response to an interval between successive resets of the timer means exceeding a predetermined length, said system being programmed to supply predetermined reset signals to said reset signal input, and thereby reset the timer means, at intervals which do not exceed said predetermined length and being arranged to respond to the generation of a said output signal by assuming a predetermined state, said reset signals each being in the form of a multibit word having a predetermined value, which predetermined value changes for successive reset signals in a predetermined manner, said arrangement being arranged to also generate a said output signal should each reset signal supplied to the reset signal input not have the relevant predetermined value.

Watch-dog circuit arrangements are well-known, and serve to monitor the correct implementation of a dat processing system program. The timer means may, for example, take the form of a continuously clocked counter which produces an overflow signal (the timer means output signal) should its capacity be exceeded, the counter being provided with a reset input a signal applied to which results in the counter contents being set to zero. In its simplest form the data processing system could comprise a suitably programmed microcomputer a single bit-line of one of the output ports of which is coupled to the reset input of the counter, the computer being programmed in such a way that a signal which resets the counter is periodically applied to the signal bit-line at such a rate that the counter is always reset before its contents overflow. Thus in normal operation the counter never produces an overflow signal. If, however, the implementation of the program should cease for some reason, resulting in the resetting of the counter also ceasing, then the counter contents will eventually reach the maximum, and the counter will produce an overflow signal. The overflow signal output may, for example, be coupled to a general reset input of the microcomputer, so that the microcomputer is itself reset under these circumstances. A similar result is obtained if the microcomputer should incorrectly enter a program loop which does not include a step entailing the application of a reset signal for the timer to the single bit line, or which does include such a step but in which this step is repeated insufficiently frequently to prevent the counter contents overflowing.

GB-A-1 522 810 discloses a system as defined in the first paragraph, i.e. a system which constitutes an elaboration of the simple system discussed so far. In this more elaborate system each reset signal takes the form of a multibit word having one of a pair of predetermined values which alternate and are each the complement of the other. The timer means is only reset in response to the supply of such a reset signal if that signal has the relevant predetermined value. In consequence, if for example a data bus which may be used to communicate the reset signals to the watch-dog circuit arrangement becomes faulty, thereby mutilating the reset signals, the timer means will not in fact be reset and the output signal will in consequence be generated. (In the known system the output signal is used to activate an alarm). Thus a check is also made on the correct operation of the data bus. One of the two multibit words is stored, apparently permanently, in memory. When a reset operation for the timer means is performed this word is written into a register and thence sent as a reset signal to the watch-dog arrangement. The contents of the register are then complemented and the result is also sent to the watch-dog arrangement, the two words thus sent together resulting in resetting of the timer means. The above four steps are immediately successive steps in the system program and, because of this, it is very likely that if the computer should erroneously enter a program loop in which watch-dog reset signals are still produced at substantially the normal rate, the words will still occur in the correct sequence, with the result that the timer means will still be reset each time, contrary to what is required.

It is an object of the invention to mitigate this disadvantage, and to this end a programmed digital data processing system is, according to the invention, characterised in that the system is programmed to assign, during each interval between the supply of successive said reset signals to said reset signal input, the next predetermined value to a said multibit word for transmission as the next reset signal, and to perform further program steps between each such assigning operation and the immediately preceding and immediately succeeding supply of a reset signal.

It has now been recognised that by effectively providing a predetermined value assigning step between the supply of each reset word to the reset signal input and the supply of the next such reset word to the reset signal input, and including further program steps between each such assigning step and the immediately preceding and immediately succeeding reset signal supply steps, a program structure is obtained which, if the system program enters an erroneous loop, is very likely to result in the assigning and reset signal supplying steps occurring in an incorrect order, or in one or the other not occurring at all, with the result that, even if reset signals are still supplied at substantially the normal rate, it is very likely that the watch-dog circuit arrangement will generate its output signal, as required.

The predetermined manner in which the predetermined value changes for successive reset signals may in principle be any manner whatsoever (bearing in mind that it is necessary for the watch-dog arrangement to "know" the resulting sequence of multibit words which will be applied to its reset signal input in operation.) Thus, each predetermined value may be derived from the preceding one by, for example, an arithmetic operation, e.g. by addition or subtraction of a constant. Preferably, however, the predetermined value changes for successive reset signals in accordance with a cyclic sequence, enabling, for example, each predetermined value to be stored permanently in the watch-dog arrangement for comparison with the relevant reset signal received. In principle such a cyclic sequence can contain any number of said predetermined values, and each predetermined value need not in principle have any particular relationship to any of the other predetermined values. Preferably, however, the cyclic sequence consists of only two predetermined values each of which is a complemented version of the other, for example a byte consisting of alternate "0"s and "1"s enabling a check to be made on cross-talk between adjoining bits. Either one or both of these may be stored, preferably in random access memory, at any given time, from which it may be read for the relevant reset signal in an effectively non-destructive manner. If only one is stored at any given time, each said assigning operation may comprise complementing the currently stored value and replacing this currently stored value by the result. If both are stored at any given time, each said assigning operation may comprise changing over a pointer from one stored value to the other. Storing one or both values in random access memory provides a check on the relevant part of RAM being incorrectly overwritten in response to erroneous operation of the program.

It may be arranged that the timer means simply responds to each said reset signal only if the reset signal has the predetermined value, so that the timer means itself generates a said output signal when reset signals having the predetermined value are not supplied to the reset signal input during an interval which exceeds the predetermined length, even though reset signals having other values may be supplied during that interval. Preferably, however, the arrangement is arranged to respond directly to the supply of a reset signal not having the predetermined value to the reset signal input by generating a said output signal.

The system may be programmed to supply each reset signal to reset signal input within a respective predetermined time window and the watch-dog circuit arrangement may be arranged to also generate a said output signal should each reset signal supplied to the reset signal input not be supplied thereto within a said predetermined time window. It may be arranged, for example, that the watch-dog arrangement simply treats the supply of a reset signal to the reset signal input as constituting a boundary of a said interval only if this supply occurs within such a predetermined time window, so that the timer means itself generates a said output signal when reset signals are not supplied to the reset signal input within respective said time windows during an interval which exceeds the predetermined length, even though reset signals may still be supplied outside such time windows. Preferably, however, the arrangement is arranged to respond directly to the supply of a reset signal to the reset signal input outside a said time window by generating a said output signal. During a malfunction it can be that reset signals are supplied outside such time windows, in which case the malfunction will be responded to. It may be arranged that each said predetermined time window has a predetermined relationship to the instant at which the immediately preceding reset signal was applied to the reset signal input. Thus, if for example the timer means comprises a continuously clocked binary counter to a reset input of which the reset signal input is coupled each time window may correspond to the time during which a particular bit of the counter contents has a given value. If this is the case the system may be programmed to periodically test the value of said particular bit to determine when it has changed to the given value, to supply a reset signal to the reset signal input after such a change has been detected and to perform further program steps between the detection of such a change and the subsequent supply of the reset signal. Performing the further program steps, i.e. separating the reset signal in time from the detection which has given rise to it, makes it less likely that, during a malfunction, the reset signal will be supplied within a said time window.

Preferably the system is programmed to strobe the watch-dog circuit arrangement, for example by generating an address specific to the watch-dog arrangement, each time a reset signal is supplied to the reset signal input. This can facilitate, for example, a direct response of the watch-dog arrangement to the supply of a reset signal not having the predetermined value and/or a reset signal outside a said time window to the reset signal input.

If the system comprises a programmed microcomputer provided with an external address latch the address latch and the watch-dog circuit arrangement are preferably integrated on the same semiconductor chip.

Figure 2:
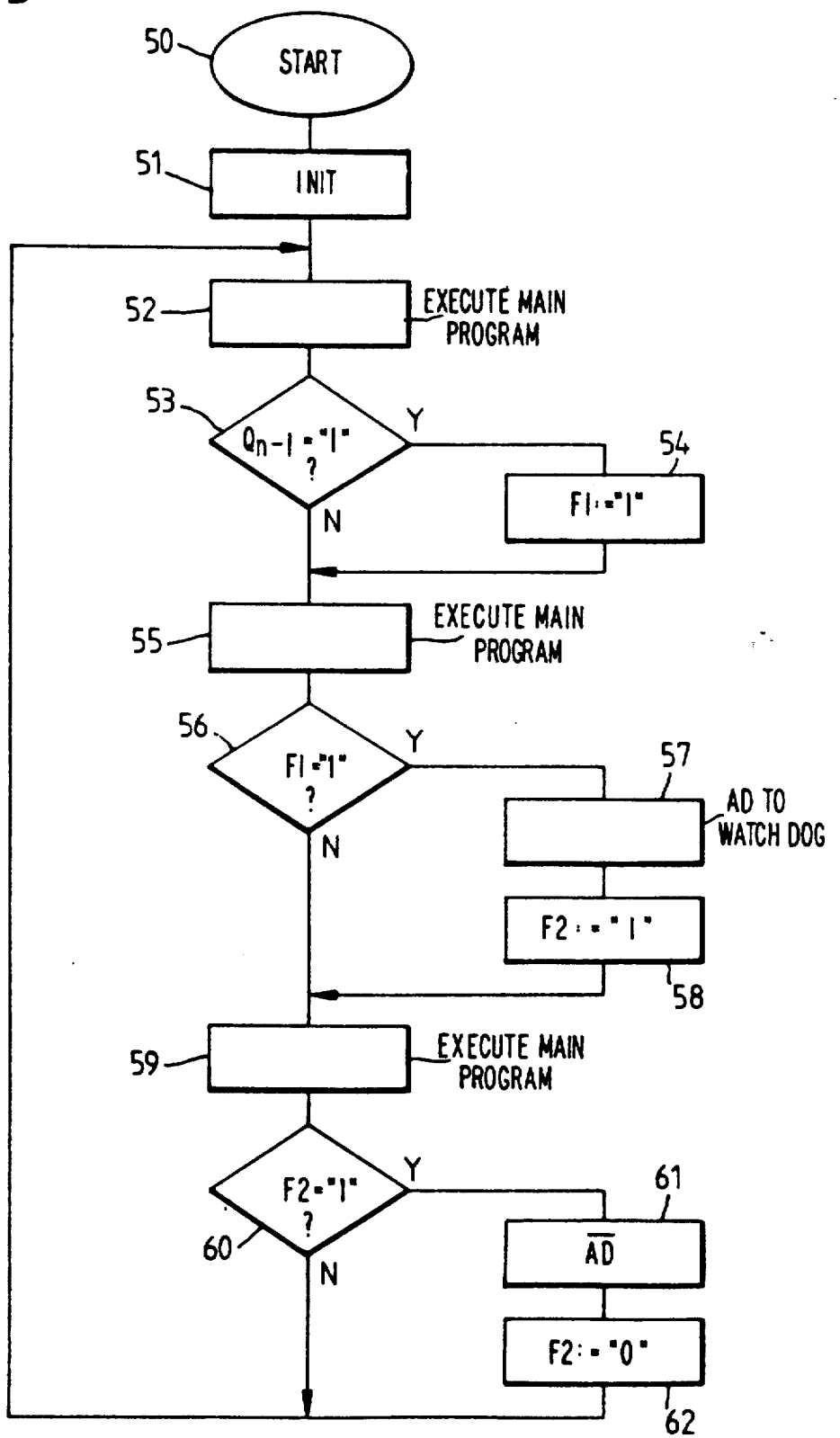

An embodiment of the invention will now be described, by way of example, with reference to the accompanying diagramatic drawings in which, FIG. 1 is a block diagram of the embodiment, and FIG. 2 is a flow chart illustrating the operation of the embodiment of FIG. 1.

FIG. 1 shows a programmed digital data processing system which comprises a programmed microcomputer 1 provided with an external address latch 5, and a watch-dog circuit arrangement.

Microcomputer 1 has lower order combined address and data bus lines AD0-AD7 and higher order address bus lines A8-A15 which may be coupled to other parts (not shown) of the system, for example to a program and/or data store, as indicated at 2, 3 and 4. Because the bus lines AD0-AD7 have a dual function the address latch 5 is provided in known manner. When microcomputer 1 outputs a 16-bit address it also outputs an address latch enable signal on an output ALE which is connected to a strobe input 7 of the latch 5. This signal causes latch 5 to store the eight lower order address bits presented to its input 6 and apply them to, inter alia, the output 4, the eight higher order address bits being applied to the output 3, after which the address/data bus lines AD0-AD7 become available for the inputting to and/or outputting from microcomputer 1 of data bits, inter alia via the data input/output 2. Microcomputer 1 also has in known manner an output RD for an active-low read control signal, an output WR for an active-low write control signal and an input RST for an active-low reset signal. Outputs RD and WR may be coupled to other parts (not shown) of the system as indicated diagrammatically at 8 and 9.

The watch-dog arrangement comprises first and second comparators 10 and 11, an eight-into-one decoder 12, a two-into-one multiplexer 13, a frequency divider-by-two formed by a D-type flip-flop 14 the output Q of which is connected to its data input D via an inverter 44, a D-type flip-flop 15, a clock pulse source 16, a counter 17, an eight-bit-wide output buffer 18, a power-up reset pulse generator 68, two AND-gates 69 and 70, a NOR-gate 19, and two OR-gates 20 and 21. The output of latch 5 is connected to an eight-bit wide first input 22 of comparator 11, a fixed eight-bit byte Z being applied to an eight-bit-wide second input 23 thereof. The (active-low) output 27 of decoder 12 is connected to a single-bit-wide third input 24 of comparator 11 to a single-bit-wide fourth input 25 of which a fixed logic "0" signal is applied. Comparator 11 compares the group of bits applied to its input 22 with the group of bits applied to its input 23, and compares the bit applied to its input 24 with the bit applied to its input 25, and generates logic "0" at its output 26 if and only if correspondence occurs in both cases. Decoder 12 generates logic "0" at its output 27 if and only if microcomputer 1 generates a specific group of bits on the bit lines A8–A15 which are connected to the decoder input 46. Thus the arrangement 11, 12 constitutes an address decoder for the watch-dog arrangement; comparator 11 generates logic "0" on its output 26 if and only if microcomputer 1 generates an address the eight lower-order bits of which correspond to the byte Z and the eight higher-order bits of which correspond to the bit group to which decoder 12 responds. Thus the comparator input 22 and the decoder input 46 together constitute a strobe signal input of the watch-dog. The comparator output 26 is connected to one input of each of the OR-gates 20 and 21 to second inputs of which are connected the microcomputer outputs RD and WR respectively. Thus gate 20 generates logic "0" on its output 28 if and only if microcomputer 1 addresses (strobes) the watch-dog and also generates an active-low read signal, and gate 21 generates logic "0" on its output 29 if and only if microcomputer 1 addresses (strobes) the watch-dog and also generates an active-low write signal.

The address/data bit lines AD0–AD7 are also connected to an eight-bit-wide first input 30 of comparator 10 to a second eight-bit-wide input 31 of which is connected the eight-bit-wide output 32 of multiplexer 13. The two eight-bit-wide inputs 33 and 34 of multiplexer 13 are fed with fixed eight-bit bytes X and Y respectively. The control input 35 of multiplexer 13 is fed by the output of divider-by-two flip-flop 14. Comparator 10 has an active-low strobe signal input 36 which is connected to the output 29 of gate 21. The output 37 of comparator 10 is connected both to the data input D of flip-flop 15 directly and also via AND-gate 70 to the (active-low) reset input RS of counter 17. The (negative-edge-responsive) clock input 38 of flip-flop 15 is connected to the output of gate 21 and the clock input 39 of counter 17 is connected to the output of clock signal generator 16. The two inputs of gate 19 are connected to the output Q of flip-flop 15 and to the most significant bit output Qn of counter 17 respectively, its output being connected via AND-gate 69 to the active-low input RST of microcomputer 1, to the active-low asynchronous reset inputs RST of flip-flops 14 and 15, and to the second input of AND-gate 70. The second input of AND-gate 69 is fed from the output of the generator 68 which produces a logic "0" output pulse for a short time each time the system is powered up. Generator 68 may comprise, for example, a Schmitt trigger circuit the input of which is connected to one power supply line via a capacitor and to the other power supply line via a resistor. Thus microcomputer 1, flip-flops 14 and 15, and counter 17 are reset on power-up and also should either the output of flip-flop 15 or the most significant bit output of counter 17 become logic "1". When flip-flop 14 is in the reset state it controls multiplexer 13 to supply the byte X to the input 31 of comparator 10.

The most-significant-but-one bit output $Qn-1$ of counter 17 is coupled to all the bit lines AD0–AD7 via the multiple output buffer 18, an active-low output-enable signal input 40 of which is connected to the output 28 of gate 20. The output $Qn-1$ of counter 17 is also connected to the (negative-edge-responsive) clock input 41 of divider-by-two flip-flop 14 and also to a single-bit third input 42 of comparator 10. A single-bit fourth input 43 of comparator 10 is supplied with a fixed logic "1" signal. The signal level on the output 37 of comparator 10 is normally logic "1". Comparator 10, if and only if a logic "0" level is present on its strobe input 36, compares the byte presented to its input from the bit lines AD0–AD7 with the byte (X or Y) presented to its input 31 by the multiplexer 13, and compares the level on its input 42 with the logic "1" presented to its input 43, and generates logic "0" on its output 37 if and only if correspondence occurs in both cases.

In operation microcomputer 1 addresses the watch-dog arrangement in two different modes, viz a read mode and a write mode in accordance with whether it produces a logic "0" on its output RD or a logic "0" on its output WR in conjunction with that address on the lines AD0–A15 which results in the the read mode the resulting enabling of the buffer 18 by the output signal of gate 20 causes this buffer to write the logic state of output $Qn-1$ of counter 18 onto the bus lines AD0–AD7 and hence to the microcomputer 1 which can thus ascertain what this logic state is. In the write mode (which in normal operation only occurs when the said logic state is "1"; see below) microcomputer 1 in normal operation puts that one of the bytes X and Y which is currently being presented to input 31 of comparator 10 by multiplexer 13 onto the bit lines AD0–AD7. Assuming that output $Qn-1$ of counter 17 is in fact logic "1" comparator 10, strobed by the logic "0" fed to its input 36 by gate 21, produces logic "0" on its output 37. This logic "0" resets the contents of counter 17 to zero and is also stored in flip-flop 15 which is clocked by the negative-going transition on the output of gate 21. Both inputs of gate 19 are therefore logic "0", so that reset inputs RST of microcomputer 1 and flip-flops 14 and 15 are logic "1", i.e. no resets of these items occur. The resetting of timer/counter 17 results in the level at its output $Qn-1$ changing from logic "1" to logic "0", and this transition changes over the frequency divider-by-two flip-flop 14 to its other output state, thereby causing multiplexer 13 to feed the other of the bytes X and Y to input 31 of comparator 10. In normal operation the next time microcomputer 1 accesses the watch-dog in the write mode it is arranged to put this other byte onto the bit lines AD0–AD7, so a similar result occurs to that just described. The bytes X and Y are put on to the bit lines AD0–AD7 alternately for successive accesses of the watch-dog in the write mode, input 30 of comparator 10 therefore constituting an 8-bit wide input for a reset signal for timer/counter 17.

A reset signal will be applied to microcomputer 1 and flip-flops 14 and 15 by gate 19 if either of the two inputs of gate 19 become logic "1" for some reason. A first way in which this can happen is because counter 17 (which is continuously clocked by source 16) is not reset sufficiently frequently to prevent its most significant bit output Qn from becoming logic "1". The program implemented by microcomputer 1 is arranged to contain watch-dog write operations at sufficiently short intervals to ensure that in normal operation this situation never occurs, provided that each such write operation gives the results set forth in the immediately preceding paragraph above. However, if the program implementation should stop for some reason, or should erroneously enter a program loop which does not include a wtch-dog write operation, then it will be evident that output Qn of counter 17 will eventually become logic "1", resetting microcomputer 1 via gate 19 as required. This of course would also be the case with the known watch-dog arrangements. However, the arrangement shown also responds to certain other malfunctions of the system, as will be explained below. A second "1", way in which one of the two inputs of gate 19 will become logic 15. Flip-flop 15 is clocked each time the watch-dog is addressed in the write mode, and if the correct byte X or Y should not then be present on the bit lines AD0-AD7, so that comparator 10 fails to produce logic "0" on its output 37 then logic "1" will be clocked into flip-flop 15, appear at its output Q and thus be applied to NOR-gate 19, resulting in a reset signal being applied immediately to microcomputer 1, i.e. without waiting for output Qn of counter 17 to become logic "1".

As a first point it should be noted that, in addition to the microcomputer being reset in response to the counter overflowing, in the system of FIG. 1 resetting of microcomputer 1 also occurs directly in response to the generation by microcomputer 1 of a byte other than the correct one, X or Y, on the address/data bit lines AD0-AD7 when the watch-dog is addressed in the write mode, because flip-flop 15 is set under these conditions. Thus microcomputer 1 will be reset directly should one or more of the bit outputs AD0-AD7 malfunction (and in fact also should one or more of the bit outputs A8-A15 malfunction), and also should microcomputer 1 erroneously enter a short program loop in which it does not produce the bytes X and Y alternately. Furthermore, microcomputer 1 may be programmed to store these bytes in RAM, retrieving them and rewriting the retrieved byte each time they are required. If this is the case the watch-dog arrangement will provide a check on whether the relevant part of RAM becomes corrupted for some reason, for example if the program causes the relevant storage locations to be overwritten, as may occur in certain error situations. If this should occur a reset signal for the microcomputer will be automatically generated. The alternating bytes X and Y may each be derived from the other; each may be, for example, the complement of the other. If this is the case only a single RAM location will be required to store them, the microcomputer then being programmed to access this location each time X or Y is required, supply its contents to the watch-dog, and write the accessed byte back to the same location and, in between each pair of successive such accesses, convert the stored byte into the other while performing further program steps between each such conversion operation and the immediately preceding and immediately succeeding access/supply operations. If this is the case the bytes X and Y are preferably 10101010 and 01010101 respectively, to provide some check on cross-talk between adjacent ones of the bit lines AD0-AD7.

As a second point, attention is drawn to the connection of the least signficant bit but one output $Qn-1$ of counter 17 to input 42 of comparator 10 (in which the level on this output is compared with the logic "1" applied to input 43). This means that when the watchdog is addressed in the write mode then, unless output $Qn-1$ is then logic "1", comparator 10 will not produce a logic "0" output signal even if microcomputer 1 then applies the correct byte X or Y to the bit-lines ADO-AD7. In other words, if the watch-dog is addressed in the write mode at a time when output $Qn-1$ of counter 17 is logic "0", flip-flop 15 will apply a reset signal to microcomputer 1 via gate 19. This feature can provide a further check on the correct implementation of the program in microcomputer 1, and is the reason for the provision of the output buffers 18 and the facility for addressing the watch-dog arrangement in the read mode. The microcomputer 1 can be programmed to periodically address the watch-dog in the read mode to ascertain the logic state of output $Qn-1$ of counter 17 and thereby determine when this state has changed from "0" to "1" and set a flag when this has occurred. The write mode addressing steps also included in the program may be arranged to actually take place, also resetting the flag, only if the flag is in fact set at the relevant time. The period of the rectangular-wave signal appearing at output $Qn-1$ is, of course, known, being determined by the output frequency of generator 16 and the capacity of counter 17. The frequency of the read-mode addressing steps and the interval between each such step and the next write-mode addressing step can therefore be chosen such as to ensure that, in normal operation, each time such a write-mode addressing step occurs, if the flag is set then the signal at output $Qn-1$ is still logic "1". (The condition for this is that the interval between each pair of successive read-mode addressing steps plus the interval between the second of these steps and the next write mode addressing step must be less than half the period which the signal at output $Qn-1$ would have were counter 17 allowed to run freely.) If, within this constraint, each write mode addressing step is spaced in time as far as possible in the program from the immediately preceding read mode addressing step this will reduce the likelihood that, should a short program loop entered by microcomputer 1 actually include a watch-dog write-mode addressing step, it will also include the watch-dog read-mode addressing step required to prime it. A further advantage of testing output $Qn-1$ and only writing to the watch-dog when the level thereat has changed from "0" to "1" is that the repetition rate of the watch-dog write operations is automatically adjusted to lie between one half and one times the frequency of the signal at output $Qn-1$, enabling this repetition rate to be optimised and to be little dependent on what branches the program actually takes each time it is carried out.

An example of the parts of the program with which microcomputer 1 may be programmed which are relevant to the present invention is shown in FIG. 2, which takes the form a of flow chart. In this Figure the various blocks have the following significances.

50—Start. (A reset signal applied to reset input RST of microcomputer 1 in FIG. 1 results in a return of the program to this stage).
  51—Initialise, including the writing of byte X (see the description of FIG. 1) to a specific address AD in RAM and the setting of flags F1 and F2 to logic "0".
52—Part of main program.
53—Is output $Qn-1$ of counter 17 in FIG. 1 logic "1"?
54—Set flag F1 to logic "1".
55—Part of main program
56—Is flag F1 logic "1"?
57—Write contents of RAM address AD to watch-dog.
58—Set flag F2 to logic "1". Set flag F1 to logic "0".
59—Part of main program.
60—Is flag F2 logic "1"?
61—Complement contents of RAM address AD.
62—Set flag F2 to logic "0".

After START (stage 50) the byte X is written in step 51 to a location AD in RAM which is preferably one which is likely to be overwritten should the program malfunction. Moreover a flag F1 which is used to indicate when the signal at output Qn−1 of counter 17 has been determined as being logic "1" is set to logic "0" as is a flag F2 which is used to indicate when the watch-dog has been written to. Then (step 52) part of the main program of the microcomputer is carried out. It is then tested in step 53 whether output Qn−1 is logic "1", microcomputer 1 first generating address byte Z on its outputs AD0-AD7 and the byte to which decoder 12 responds on its outputs A8-A15, and then logic "0" on its output RD (read mode), reading the output signal of the thus enabled buffer 18 on its outputs/inputs AD-0-AD7. If Qn−1 is "1" (Y) flag F1 is set to "1" in step 54, and in any case another part of the main program is then carried out in block 55. After this it is ascertained in step 56 whether flag F1 is set, i.e. whether it was determined in step 53 that Qn−1 was logic "1". If it was (Y), the contents of RAM address AD (initially byte X, for example 01010101), are written to the watch-dog in step 57 (and also rewritten to the address AD) microcomputer 1 first generating address byte Z on its outputs AD0-AD7 and the byte to which decoder 12 responds on its outputs A8-A15, and then logic "0" on its output WR (write mode) and the byte X from RAM address AD on its outputs AD0-AD7. In normal operation, when step 57 occurs, output Qn−1 will still be logic "1", resulting in counter 17 being reset, changing over flip-flop 14, but no general reset occurring. Flag F1 is then reset and flag F2 is set to "1" (block 58) indicating that the watch-dog has been written to. The program then proceeds to block 59, as it does directly from step 56 if it is found there that flag F1 is not set (N). Block 59 represents the next part of the main program, after which flag F2 is tested (step 60) to ascertain if step 57 in fact took place. If it did (Y) the byte in RAM address AD is complemented and rewritten in step 61 so that it becomes Y to conform with the new state of multiplexer 13, after which flag F2 is reset in step 62 and the program proceeds back to block 52, as it does directly if the result of test 60 is "no" (N).

In order that, if the result of test 53 is "yes", output Qn−1 of counter 17 will still be "1" when step 57 is performed it is arranged that, provided the system is operating correctly, the time interval between successive pairs of tests 53 plus the time to the next step 57 if it is in fact carried out is always less than one half the period of the signal appearing at output Qn−1 of counter 17.

If required, a delay element (not shown) may be provided at the output of gate 69 in FIG. 1 to ensure that any reset signal produced thereat has a sufficiently long duration before the counter 17 or flip-flop 15 which may have given rise to it is itself reset.

It will be appreciated that the parts of the system shown in FIG. 1, other than the microcomputer 1, may be very conveniently all be integrated on the same semiconductor chip.

From reading the present disclosure, other modifications will be apparent to persons skilled in the art. Such modifications may involve other features which are already known in the design, manufacture and use of systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A programmed digital data processing system including:
   (a) a watch-dog circuit comprising:
      (i) a reset signal input means for receiving successive reset signals;
      (ii) timer means, coupled to be reset in response to the successive reset signals having a relevant predetermined value; and
      (iii) means for supplying an output signal when a time interval between successive resets of the timer means exceeds a predetermined length;
   (b) programmed means for
      (i) assuming a predetermined state in response to said output signal;
      (ii) supplying the successive reset signals to said reset signal input means at time intervals which do not exceed said predetermined length, said successive reset signals each being in the form of a multibit word having the relevant predetermined value, which relevant predetermined value changes for the successive reset signals in a predetermined manner;
      (iii) assigning, during each interval between successive reset signals, a next predetermined value to the multibit word for transmission as a next reset signal; and
      (iv) performing program steps, of a program being watched by the watch-dog circuit, between:
         (A) each assigning operation and an immediately preceding supply of a reset signal; and
         (B) each assigning operation and an immediately succeeding supply of a reset signal.

2. A system as claimed in claim 1 wherein said predetermined value changes for successive reset signals in accordance with a cyclic sequence.

3. A system as claimed in claim 2, wherein the sequence consists of two predetermined values each of which is a complemented version of the other.

4. A system as claimed in claim 3, wherein each multibit word is a byte consisting of alternate "0"s and "1"s.

5. A system as claimed in claim 1, further comprising a random access memory for storing the multibit word, so that the multibit word is read for each said reset signal in an effectively non-destructive manner.

6. A system as claimed in claim 1, wherein each assigning operation comprises calculating the predetermined value of the multibit word for transmission as the next reset signal from the multibit word transmitted as the immediately preceding reset signal.

7. A system as claimed in claim 1, wherein the watch-dog circuit responds directly to one of the reset signals not having the relevant predetermined value by generating said output signal.

8. A system as claimed in claim 1, wherein the programmed means strobes the watch-dog circuit arrangement each time a reset signal is supplies to the reset signal input means.

9. A system as claimed in claim 2, 7, 1, 11, 12, or 13, wherein the programmed means comprises a programmed microcomputer having an external address latch, the address latch and the watch-dog circuit arrangement being integrated on the same semiconductor chip.

10. The system of claim 1 wherein said programmed means comprises a reset input coupled to receive said output signal and said predetermined state is a reset state.

11. The system of claim 1 wherein the supplying means of the watch dog circuit is coupled directly to the reset signal input means and supplies said output signal in response to the successive reset signals not having the predetermined value, independently of the predetermined time interval.

12. The system of claim 1 wherein he timer is not reset when the successive reset signals do not have the predetermined value.

13. A digital data processing system comprising:
 (a) programmed means for:
  (i) supplying reset signals to a watchdog circuit, at time intervals which do not exceed a predetermined length, said reset signals each being in the form of a multibit word having a relevant predetermined value, which relevant predetermined value changes for successive reset signals in a predetermined manner;
  (ii) assigning, during each interval between successive reset signals, a next predetermined value to the multibit, word according to the predetermined manner;
  (iii) performing program steps of a program between:
   (A) each assigning operation and an immediately preceding supply of a reset signal;
   (B) each assignign operation and an immediately succeeding supply of a reset signal;
 (b) a watchdog circuit for watching the program, which watchdog circuit includes:
  (i) means for receiving the reset signals;
  (ii) means for determining whether the received reset signals have the predetermined value;
  (iii) resettable timer means for measuring time intervals of the predetermined length, which timer means is reset in response to a positive determination by the determining means;
  (iv) means for supplying an output signal to the programmed means if the timer means has measured a time intervale of the predetermined length or in response to a negative determination by the determining means, whereby the output signal indicates a possible infinite loop in the program.

* * * * *